United States Patent [19]
Sotani

[11] Patent Number: 5,481,711
[45] Date of Patent: Jan. 2, 1996

[54] PROGRAM EDITING SYSTEM

[75] Inventor: Yoshikazu Sotani, Tokyo, Japan

[73] Assignee: NEC Corporation, Tokyo, Japan

[21] Appl. No.: 1,663

[22] Filed: Jan. 7, 1993

[30] Foreign Application Priority Data

Jan. 17, 1992 [JP] Japan ................................ 4-26117

[51] Int. Cl.$^6$ .................................................. G06F 17/00
[52] U.S. Cl. ...................... 395/700; 364/273; 364/243.44
[58] Field of Search ..................................... 395/700, 650

[56] References Cited

U.S. PATENT DOCUMENTS 5,276,880  1/1994  Platoff et al. ........................... 395/700

OTHER PUBLICATIONS

Sobell, Mark, "A Practical Guide to the Unix System", 2nd Ed Pub. Benjamin Cummings 1989 pp. 409–434, 571–582.
Aho, Kernighan, Weinberger, "The AWK Programming Language", Addison–Wesley Publishing Co., 1988, pp. 21–23, 59–60, 131–135.

Mason and Brown, "LEX and YACC", pub. O'Reilly & Associates 1991, pp. 128–138.
Dougherty, Dale, "Sed & Awk", pub. O'Reilly & Associates pp. 8–26, 56–65, 1991.

*Primary Examiner*—Kevin A. Kriess
*Assistant Examiner*—St. John Courtenay, III
*Attorney, Agent, or Firm*—Foley & Lardner

[57] ABSTRACT

The present invention relates to a system for readily editing a text data program lexically and structurally. A first conversion is carried out such that the text data program is converted into a structure-type data internal representation by using the grammar rules of the program and the internal representation definition which defines the data structure of a structure-type data internal representation. The structure-type data internal representation has the structure information of the program as the structure-type data. This structure-type data internal representation is edited according to given editing instructions. By using the grammar rules of the program and the internal representation definition, a second conversion is carried out such that the edited structure-type data internal representation is converted into the corresponding text data program.

6 Claims, 4 Drawing Sheets

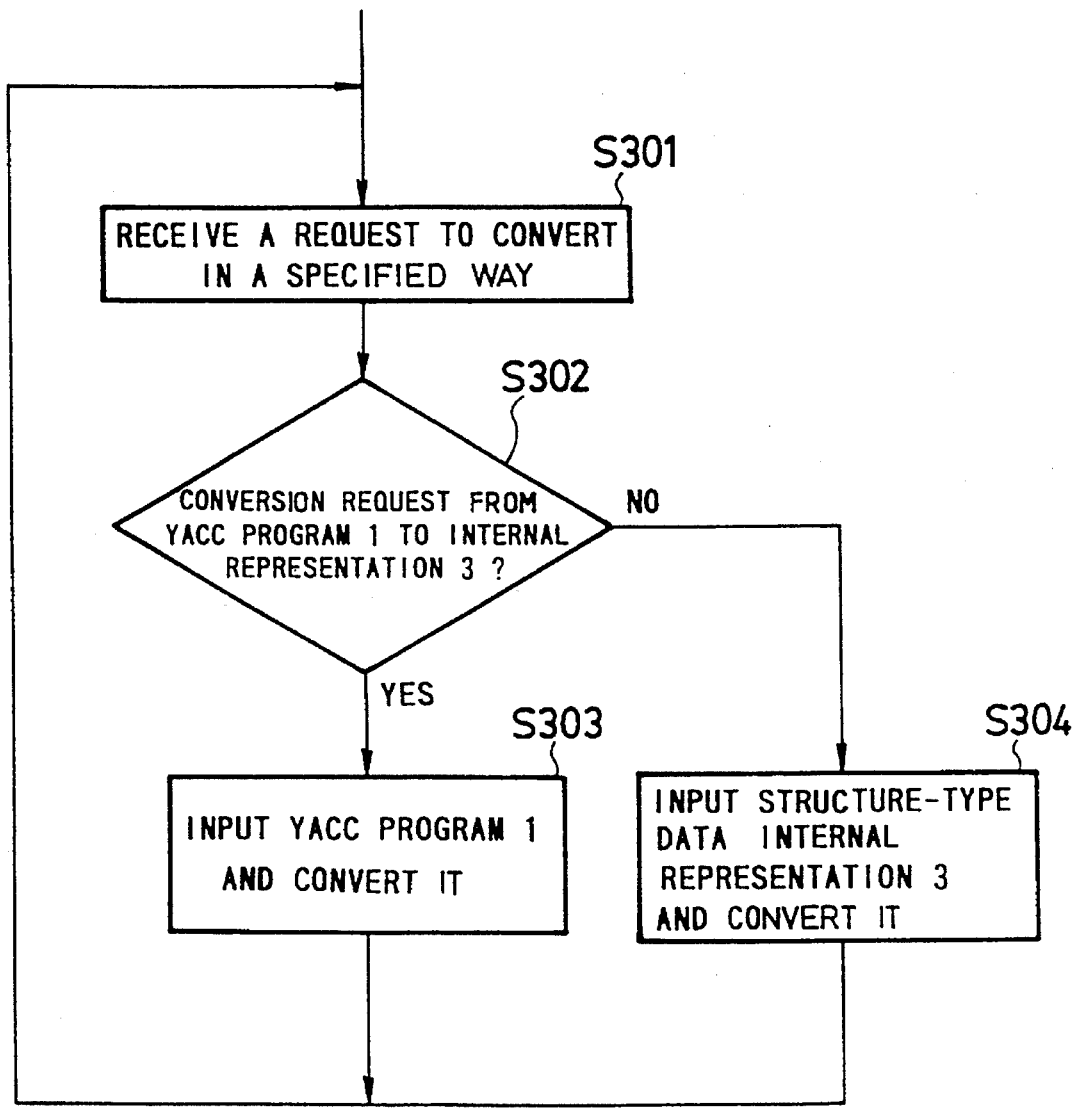

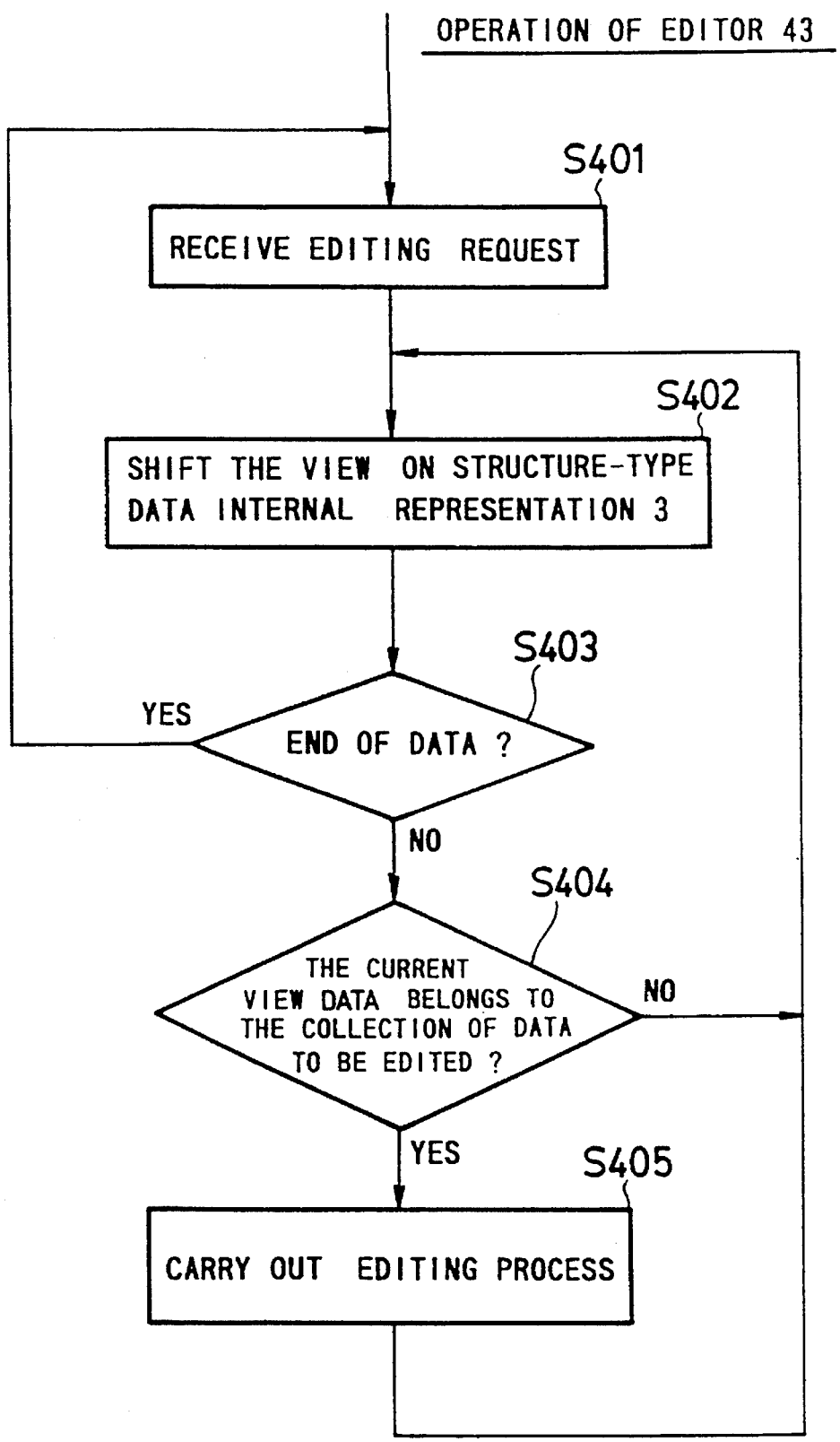

PROGRAM EDITING SYSTEM

FIELD OF THE INVENTION

The present invention relates to program editing systems and, in particular, to a system for readily editing a program described according to predetermined grammar rules.

BACKGROUND OF THE INVENTION

By way of example, let us consider a YACC program. YACC (Yet Another Compiler-Compiler) is a program generator for generating a syntactic analysis program or a parser as already known in the field of compiler technologies, and a YACC program is one described according to YACC rules. An input YACC command calls the YACC program to be converted into a C language program achieving its function.

Such a YACC program as a source program has conventionally been treated as text data, and its editing work has been carried out by using a text editor, which has caused a difficulty in editing the program structure although it allows the lexical elements to be edited. That is, if the program structure suffers some change, then the need to change the entire program has arisen and a vast amount of labor has been needed for editing it anew. Further, occasionally, it has been necessary to uneconomically recode the entire program from the very beginning.

SUMMARY OF THE INVENTION

An object of the present invention is to solve the foregoing problems inherent to the prior art and to provide a program editing system which allows the program structure to be readily edited.

The present invention relates to a system for editing a program lexically and structurally, which first converts an input text data program into a structure-type data internal representation by using the grammar rules of the program and the internal representation definition which defines the data structure of the structure-type data internal representation. The structure-type data internal representation has the structure information of the program as the structure-type data. Editing is carried out on this structure-type data internal representation according to given edit instructions. By using the grammar rules of the program and the internal representation definition, secondly, the edited structure-type data internal representation is converted into the corresponding text data program.

Preferably, the first and second conversions mentioned above are performed by using a two-way conversion process source which allows the two-way conversion between the text data program and the structure-type data internal representation. This two-way conversion process source is generated by using the grammar rules of the program and the internal representation definition.

Preferably, the edit instructions are given by the definition of the collection of data to be edited and the definition of the editing process. The definition of the collection of data to be edited designates the portions of the structure-type data internal representation to be edited and the editing process definition defines the editing process to be carried out on the designated portions. By referencing the definition of the collection of data to be edited, the portions to be edited are searched from the structure-type data internal representation and, by referencing the editing process definition, the editing is carried out on the searched portions to be edited.

In a preferred embodiment, the foregoing program is the YACC program.

BRIEF DESCRIPTION OF THE DRAWINGS

FIG. 3 is a flowchart illustrating the data conversion according to this embodiment; and FIG. 4 is a flowchart illustrating the editing process according to this embodiment.

DETAILED DESCRIPTION OF THE PREFERRED EMBODIMENT

Figure 1:
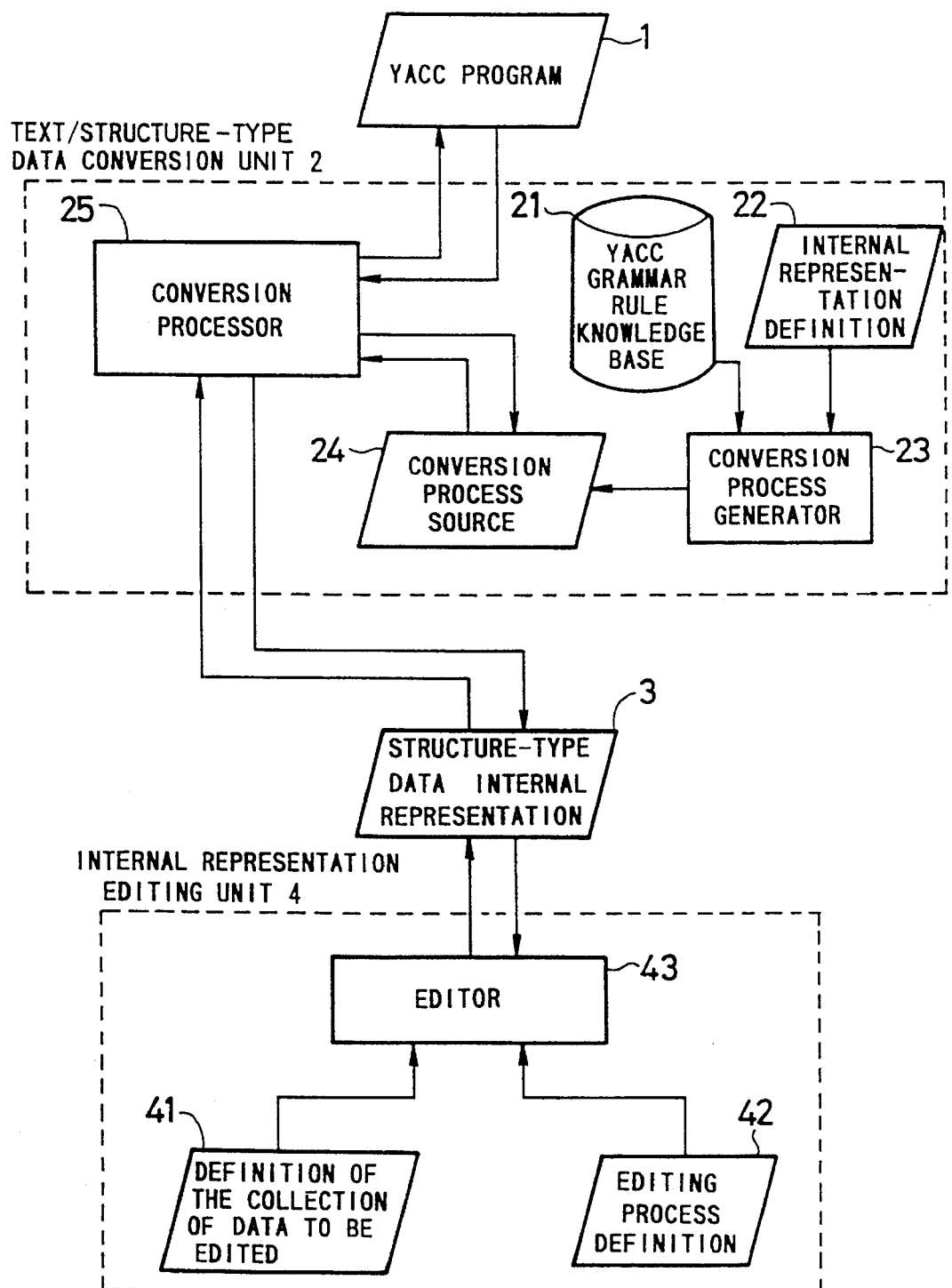
FIG. 1 is a block diagram illustrating a specific embodiment of a YACC program editing system according to the present invention.

A specific embodiment of the present invention is hereinafter described with reference to the accompanying drawings. Referring to FIG. 1, a YACC program 1 which is a text data program is provided to a text/structure-type data conversion unit 2 to be converted into a structure-type data internal representation 3, which is an internal representation or a semantic tree having the structure information of the YACC program 1 as the structure-type 20 data, and is actually stored in a memory. Inputting the structure-type data internal representation 3, an internal representation editing unit 4 edits the lexicon and/or structure. The edited structure-type data internal representation 3 is converted into the corresponding text data program by the data conversion unit 2, resulting in the edited YACC program 1.

In the text/structure-type data conversion unit 2, a conversion process generator 23 generates a conversion process source 24 by inputting YACC grammar rules from a YACC grammar rule knowledge-base 21 and an internal representation definition 22. The YACC grammar rule knowledge-base 21 is a database in which the syntaxes of the YACC program 1 are defined and accumulated, and the internal representation definition 22 is provided to define the data structure or the tree structure of the structure-type data internal representation 3. The conversion process source 24 generated by the conversion process generator 23 is a program data given to a conversion processor 25. By using that conversion process source 24, the conversion processor 25 either converts the entered YACC program 1 into the structure-type data internal representation 3 by parsing the program 1, or converts the edited structure-type data internal representation 3 into the corresponding YACC program 1 as text data by analyzing the representation 3.

The editing of the structure-type data internal representation 3 is performed by an editor 43 in the internal representation editing unit 4 according to the definition 41 of the collection of data to be edited and the definition 42 of the editing process. The definition 41 defines the conditions to be satisfied by the data to be edited within the structure-type data representation 3. Editing, for example, is confined to the action portion of a certain identifier by a certain condition of the definition 41. The definition 42 of the editing process defines the editing operation to be performed on the portions specified by the definition 41 within the structure-type data internal representations 3. The editor 43 retrieves the portions matching the definition 41 of the collection of data to be edited from the structure-type data internal representation 3 to carry out the editing process defined by the editing process definition 42.

The structure-type data internal representation 3 thus edited is converted into the corresponding text data program by the conversion processor 25 using the conversion process source 24, resulting in a YACC program 1 which has been edited not only lexically but also structurally. The operation of this embodiment will be described hereinafter in further detail.

Figure 2:
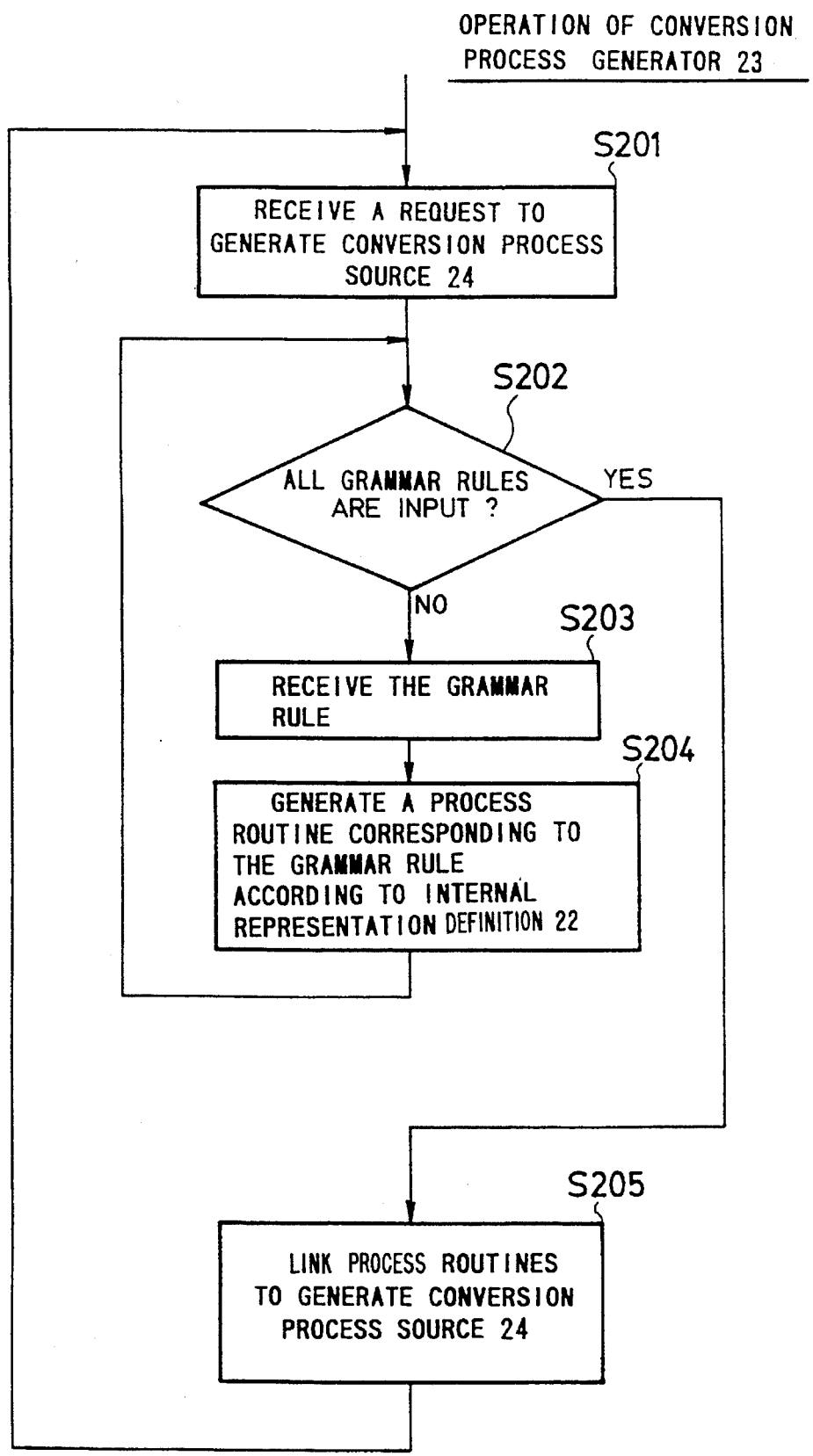
FIG. 2 is a flowchart illustrating how a data conversion routine is generated according to this embodiment.

Referring to FIG. 2, upon receipt of a request to generate the conversion process source 24 from the system (S201), the conversion process generator 23 retrieves the YACC grammar rule knowledge base 21 to examine whether all grammar rules are input or not (S202). If some granular rules are not input (NO of S202), the conversion process generator 23 inputs one of the grammar rules from the YACC grammar rule knowledge base 21 (S203) and generates a conversion process routine corresponding to that grammar rule according to the given internal representation definition 22 (S204).

The conversion process routine thus generated comprises two routines: one routine where the syntax in the YACC program 1 which is recognized to correspond to the relevant grammar rule is converted into the structure-type data internal representation 3 and the other routine where the structure-type data internal representation 3 corresponding to the relevant syntax is converted into the YACC program which is the text data.

The process steps S202 through S204 are repeated until all the grammar rules are input from the YACC grammar rule knowledge base 21 to the conversion process generator 23. If all the grammar rules are entered and the conversion process routines corresponding to those are generated (YES of S202), then the generated conversion process routines are linked to produce the conversion process source 24 (S205).

Referring to FIG. 3, the conversion processor 25 first receives a request to make a conversion in either way from the system (S301). The conversion way request comprises two requests: one to make a conversion from the YACC program 1 into the structure-type data internal representation 3 and the other to make a conversion vice versa.

If the received request is one to convert the YACC program 1 into the structure-type data internal representation 3 (YES of S302), then the conversion processor 25 inputs the YACC program 1 to convert it to the structure-type data internal representation 3 by using the conversion process source 24 generated by the conversion process generator 23 (S303). If it is the opposite request (NO of S302), then the structure-type data internal representation 3 is input to be converted into the YACC program 1, which is the text data, by using the conversion process source 24 (S304).

Referring to FIG. 4, the editor 43, upon receipt of the editing request from the system (S401), shifts the view on the structure-type data internal representation 3 (S402). If it is the first editing request, then the view is shifted to the initial position, that is, the beginning data of the memory area storing the structure-type data internal representation 3.

If the view has not been shifted in the entire structure-type data internal representation 3 (NO of S403), then it is examined whether the data pointed by the current view in the representation 3 belongs or not to the collection of data to be edited, which is defined by the definition 41 of the collection of data to be edited (S404). If the pointed data does, then the editing process defined by the definition 42 is carried out on the current view data (S405), and the control goes to the following view. If the pointed view does not (NO of S404), the control skips the S405 step and directly goes to the following view (S402). The foregoing steps S402 through S405 are repeated with the view sequentially shifted, until the view has been shifted in the entire structure-type data internal representation 3 (YES of S403).

Respective examples of the internal representation definition 22 including the YACC grammar rules, the conversion process source 24, definition 41 of the collection of data to be edited and the editing process definition 42 are hereinafter shown.

---

(1) An example of the internal expression definition 22

```
%{
typedef struct_compound_statement {
  char * c_SOURCE;
} compound_statement;
typedef struct_symbol {
  char * NONTERMINAL;
  char * TERMINAL;
  compound_statement * action;
} symbol;
typedef struct_formulation {
  symbol symbolObj;
  symbol * nextSymbol;
} formulation;
typedef struct_rule {
  char * NONTERMINAL;
  formulation * formulation_list;
  rule * nextrule;
} rule;
typedef struct_grammar {
  rule * rulelist;
} grammar;
grammar * GrammarObj;
%}
%%
/* An example of YACC grammar rules from the YACC grammar rule
knowledge base 21 */
  start
       : grammar
```

-continued

```
            { GrammarObj = GrammarCreateObj( );
                GrammarPutRulelist(GraMmarObj, $1);
            }
            ;
    grammar
            : rule
            { $$ = RuleAddRule(NULL, $1);
            }
            | grammar rule
            { $$ = RuleAddRule($1, $2);
            }
            ;
    rule
            : NONTERMINAL ':' ';'
            { $$ = RulePutNonterminal(RuleCreateObj( ) $1);
            }
    |       NONTERMINAL ':' formulation_list ';'
            { $$ = RulePutNonterminal(RuleCreateObj( ), $1);
                $$ = RulePutFormulationList($$, $3);
            }
            ;
    formulation_list
            : formulation
            { $$ = $1;
            }
            | formulation_list '|' formulation
            { $$ = FormulationAddFormulation($1, $3);
            }
            ;
    formulation
            : symbol
            { $$ = FormulationPutSymbolObj(FormulationCreateObj( ),
                                            $1);
            }
            | formulation symbol
            { $$ = FormulationPutNextSymbol($1,
                                            $2);
            }
            ;
    symbol
            : NONTERMINAL
            { $$ = SymbolPutNonterminal(SymbolCreateObj( ), $1);
            }
            | TERMINAL
            { $$ = SymbolPutTerminal(SymbolCreateObj( ), $1);
            }
            | symbol compound_statement
            { $$ = SymbolPutCompoundStatement($1, $2);
            }
            ;
    compound_statement
            : '{' '}'
            { $$ = CompoundStatementCreateObj( );
            }
            | '{' C_SOURCE '}'
            { $$ = CompoundStatementPutCSource
                    (CompoundStatementCreateObj( ), $2);
            }
            ;
```

(2) A typical example of the conversion processing source 24

```
    grammar * TStranlator(filename)
    char * filename;
    {
        yyparse( );
        return(GrammarObj);
    }
    char * STtranslator(GrammarObj)
    grammar * GrammarObj;
    {
        return(GrammarPrintText(GrammarObj));
    }
```

(3) An example of the definition 41 of the collection of data to be edited

```
    filter = {
    grammar::rulelist::formulation_list::action;
    }
```

(4) An example of the editing definition 42

-continued

```
edit = {
    replaceString( "$$ = cat4(myalloc( "(case_statement "), $2,
                                $4, myalloc( ") "));",
              "$$ = listup4(atom( "case_statement "), $2, $4,
                                );");
}
```

What is claimed is:

1. A system for editing a first text data program written in a programming language having a plurality of grammar rules, said system comprising:

first storage means for storing said plurality of grammar rules;

second storage means for storing an internal representation definition defining a designated tree structure;

conversion code generating means for generating a conversion code based on said plurality of grammar rules and on said internal representation definition, said conversion code including a directional conversion code for converting said first text data program to a first structure-type data internal representation program having said designated tree structure; and a reverse-directional conversion code for converting a second structure-type data internal representation program to a second text data program;

third storage means for storing said first and second structure-type data internal representation programs;

editing means for editing said first structure-type data internal representation program stored in said third storage means to produce said second structure-type data internal representation program; and execution control means for executing said directional conversion code when said first text data program is provided to said execution control means, and for executing said reverse-directional conversion code when said second structure-type data internal representation program has been provided to said execution control means.

2. The system as set forth in claim 1, wherein said first text data program comprises a YACC program.

3. A method for editing a first text data program written in a programming language having a plurality of grammar rules, said method comprising the steps of:

(a) storing said plurality of grammar rules;

(b) storing an internal representation definition defining a designated tree structure;

(c) generating a conversion code based on said plurality of grammar rules and said internal representation definition, said conversion code including a directional conversion code for converting said first text data program to a first structure-type data internal representation program having said designated tree structure and a reverse-directional conversion code for converting a second structure-type data internal representation program to a second text data program;

(d) executing said directional conversion code to convert said first text data program to said first structure-type data internal representation program;

(e) editing said first structure-type data internal representation program which has been generated by executing said directional conversion code in step (d) to produce said second structure-type data internal representation program; and (f) executing said reverse-directional conversion code to convert said second structure-type data internal representation program from step (e) into said second text data program.

4. The method as set forth in claim 3, wherein step (c) comprises the steps of:

reading said grammar rules;

generating conversion routines corresponding to each of said grammar rules according to said internal representation definition; and linking conversion routines respectively corresponding to said grammar rules to generate conversion code.

5. The method as set forth in claim 3, wherein said first text data program comprises a YACC program.

6. The method as set forth in claim 4, wherein said first text data program comprises a YACC program.

* * * * *